Figure 1:
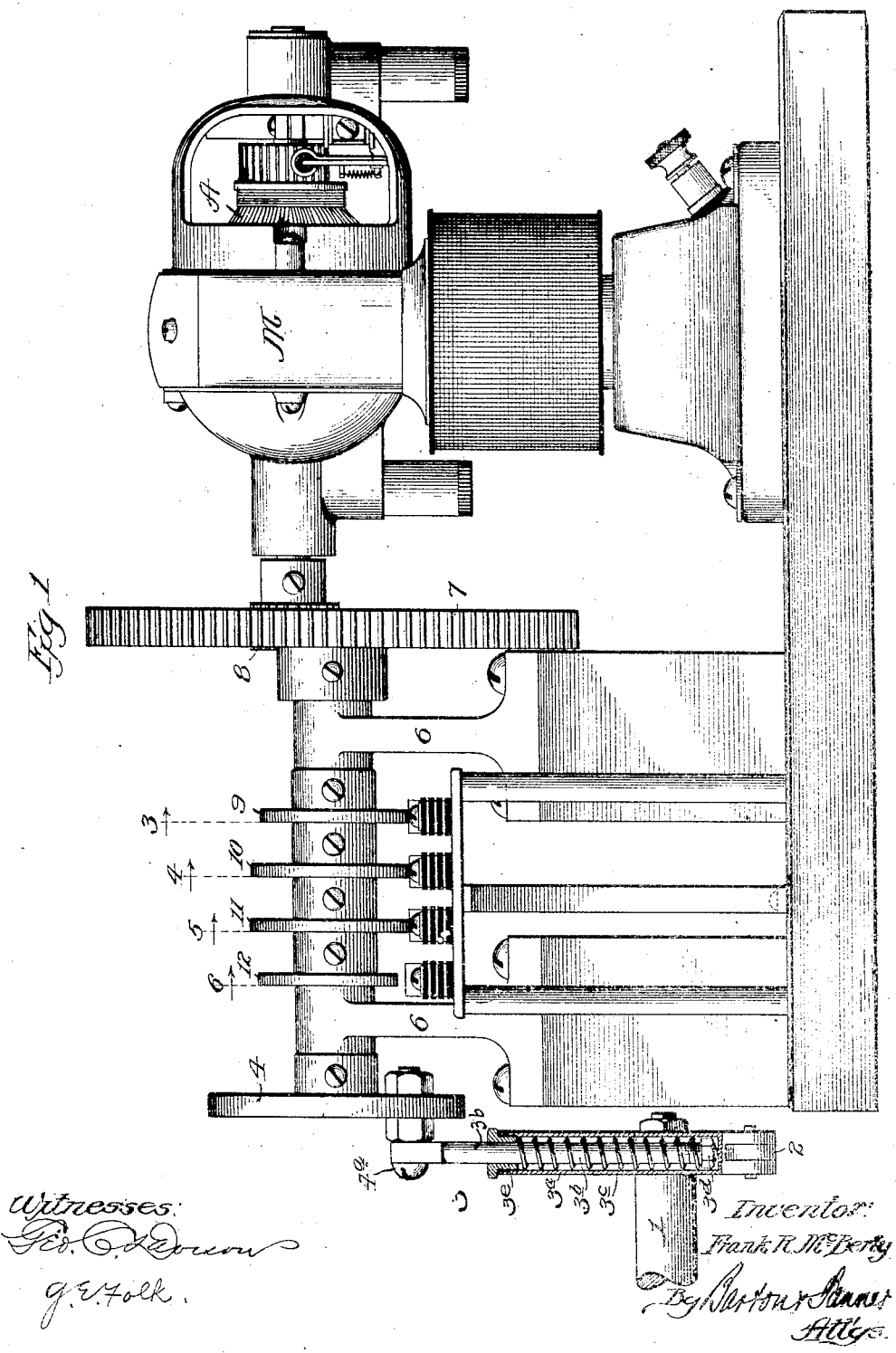

No. 841,335. PATENTED JAN. 15, 1907.
F. R. McBERTY.
ADDING MACHINE ATTACHMENT.
APPLICATION FILED FEB. 24, 1906.

4 SHEETS—SHEET 1.

No. 841,335. PATENTED JAN. 15, 1907.
F. R. McBERTY.
ADDING MACHINE ATTACHMENT.
APPLICATION FILED FEB. 24, 1906.

4 SHEETS—SHEET 2.

Witnesses:

Inventor
Frank R. McBerty
By Barton & Bennet
Attys.

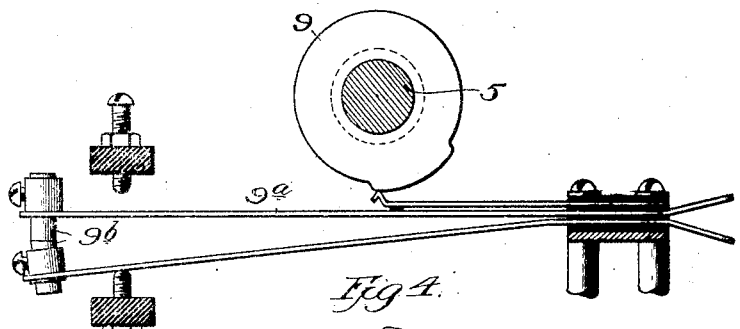
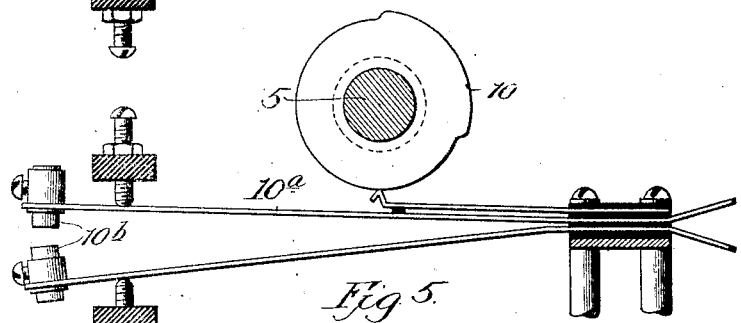
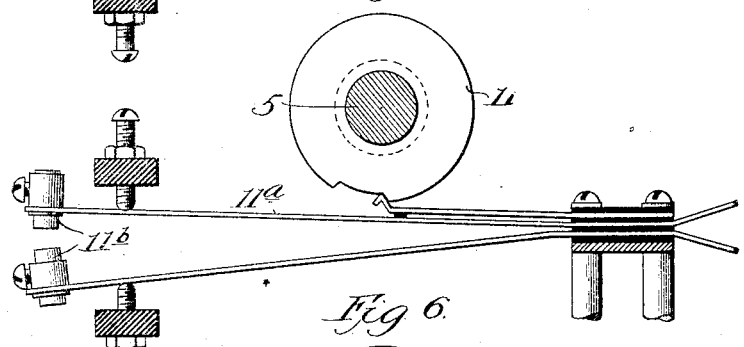
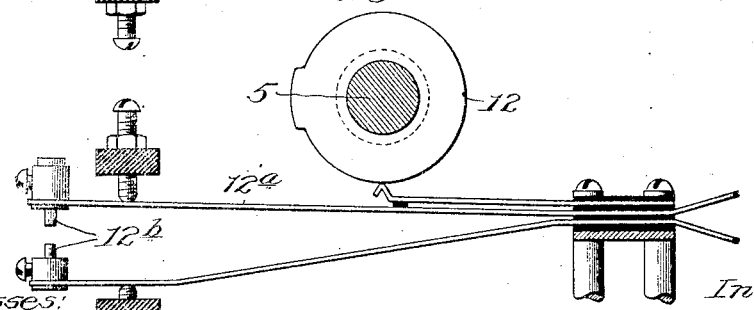

No. 841,335. PATENTED JAN. 15, 1907.
F. R. McBERTY.
ADDING MACHINE ATTACHMENT.
APPLICATION FILED FEB. 24, 1906.

4 SHEETS—SHEET 4.

Witnesses:

Inventor:
Frank R. McBerty,
By Barton & Banner
Attys.

UNITED STATES PATENT OFFICE.

FRANK R. McBERTY, OF EVANSTON, ILLINOIS, ASSIGNOR TO WESTERN ELECTRIC COMPANY, OF CHICAGO, ILLINOIS, A CORPORATION OF ILLINOIS.

ADDING-MACHINE ATTACHMENT.

No. 841,335.  Specification of Letters Patent.  Patented Jan. 15, 1907.

Application filed February 24, 1906. Serial No. 302,681.

*To all whom it may concern:*

Be it known that I, FRANK R. McBERTY, a citizen of the United States, residing at Evanston, in the county of Cook and State of Illinois, have invented a certain new and useful Improvement in Adding-Machine Attachments, of which the following is a full, clear, concise, and exact description.

My invention relates to intermittently-driven mechanism; and its object is to provide means for electrically controlling the operation of such mechanism.

My invention is especially applicable for driving the shaft of a calculating-machine or other similar mechanism having a reciprocatory motion.

My invention contemplates means for driving and automatically controlling the operation of a shaft having a reciprocatory motion—such, for example, as the shaft of a calculating-machine. In the preferred form of my invention I provide said shaft with a crank-arm connected by a rod to a driven wheel or crank which makes one complete revolution for each momentary depression of a finger-key. This driven wheel is itself rigidly connected to a shaft which, in turn, is driven by a motor through a system of gears. The circuits of the motor are automatically controlled by four cams which are also rigidly connected to the shaft of said driven wheel. These cams open and close the contacts of four switches which control the circuits of the motor. Said cams are so constructed and mounted on the shaft that the switches are opened and closed periodically with a sequence which starts the motor as soon as the finger-key is operated and cuts off the power to the same when the driven wheel has traveled a certain period of a revolution sufficient to allow the inertia of the moving parts to restore the driving mechanism, together with the shaft driven thereby, to their normal or initial positions. To prevent the momentum acquired by the inertia of the moving parts from carrying the crank-arm past the normal or idle position, it is the function of one of the four switches to close a local circuit to the armature after the main-line circuit has been opened by another of the four switches, thus producing a dynamic brake effect and stopping the motor.

A further feature of my invention consists in means for rendering the driving mechanism inoperative with reference to the shaft when said shaft is locked against rotation.

My invention also provides for such adjustment of the parts as to make the necessary compensations for currents of different voltages.

These and other features of my invention will be more readily understood by reference to the accompanying drawings, in which—

Figure 2:
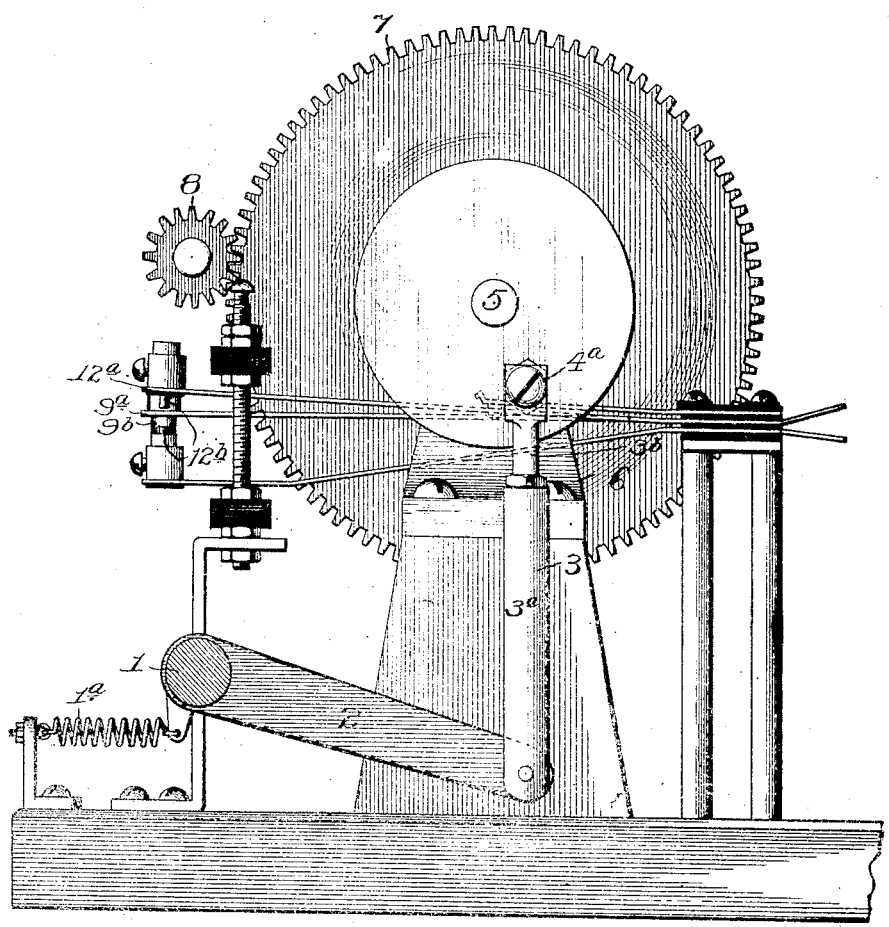
Figure 7:
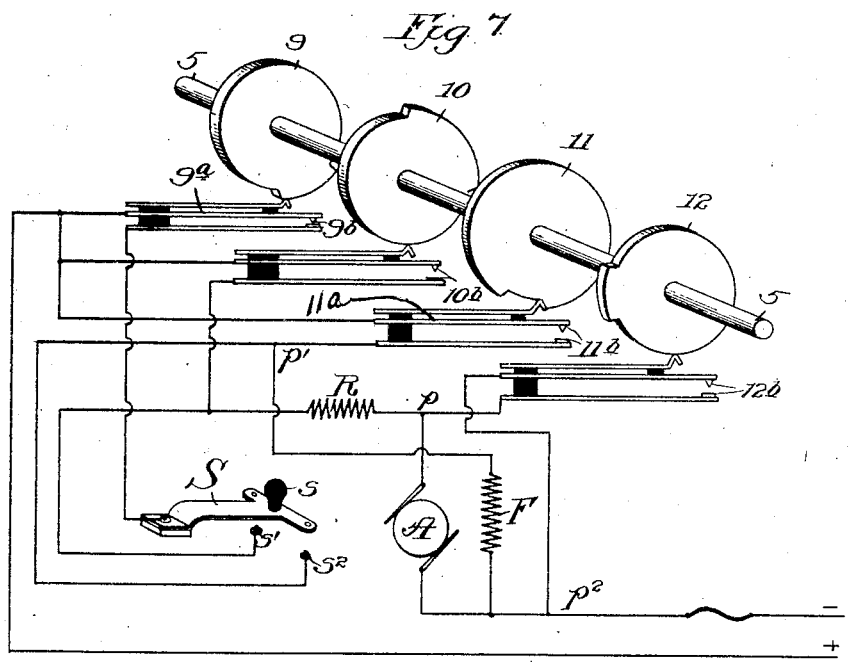
Figure 8:
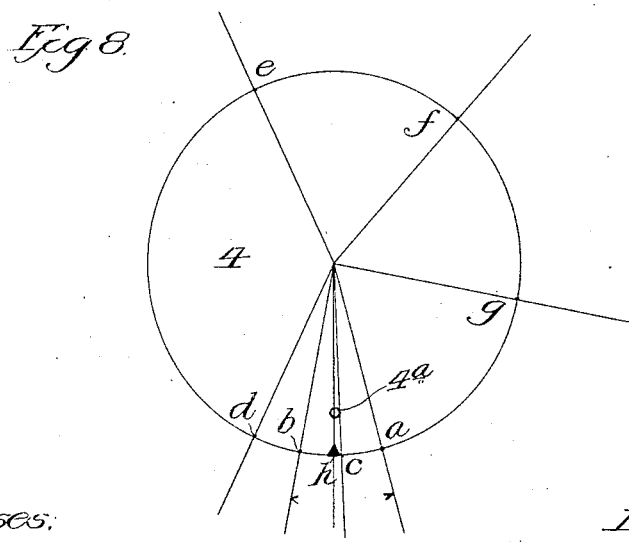

Figure 1 is a side elevation, with parts broken away, of a device embodying my invention. Fig. 2 is a front end elevation thereof. Figs. 3, 4, 5, and 6 are sectional views on the lines 3 3, 4 4, 5 5, and 6 6, respectively, of Fig. 1. Fig. 7 is a diagrammatic view showing the circuits employed, and Fig. 8 is a diagram showing the relation of the crank-wheel to the operation of the cam mechanism.

Similar characters of reference refer to similar parts throughout the different views.

The device shown in the drawings is mounted in a convenient position for attachment to the rock-shaft 1—as, for example, the driving-shaft of a calculating-machine. Such machine is of the usual construction in which said rock-shaft constitutes the means for operating the calculating and recording mechanism, and in so doing rocks through an angle of approximately forty-five degrees and back again to its initial position. It has been customary to provide calculating-machines with automatic means for locking the driving-shaft under certain conditions—as, for example, when in the use of single sheets of paper the end of the sheet has been reached and there remains no paper to record the operation. A machine of this character is shown in the United States patent to D. E. Felt, No. 694,955, granted March 12, 1902.

Keyed upon the end of the shaft 1 is one end of a crank-arm 2, the other end of said crank being pivotally connected to a rod 3, one end of which is in turn pivoted eccentrically at $4^a$ upon the crank-wheel 4. Said wheel is keyed upon the end of a shaft 5, which has bearings in brackets 6 6, mounted upon a suitable frame. The other end of shaft 5 has keyed thereon a spur-wheel 7, which meshes with a pinion 8 on the end of the armature-shaft of the motor M. It is apparent, therefore, that when the motor-armature is rotated the pinion 8 drives the wheel 7, rotating shaft 5 and the crank-wheel 4, which through rod 3 and arm 2 rocks the shaft 1 through an angle of approximately forty-five degrees during the first half of a revolution of wheel 4 and back to its initial position during the remaining half of a complete revolution.

Cams 9, 10, 11, and 12 are mounted upon the shaft 5 to rotate therewith and control the operation of switches $9^a$, $10^a$, $11^a$, and $12^a$, respectively, located underneath and in close proximity to the cams, and thereby open and close the contacts $9^b$, $10^b$, $11^b$, and $12^b$, respectively. Said cams are adjustable upon the shaft 5 and are held in their adjusted position by any suitable means—as, for example, by set-screws—as shown in Fig. 1.

In the drawings the parts are shown in their normal or idle positions with the contacts $9^b$ held closed by the cam 9, the circuit of the motor being open, however, at switch S, as shown in Fig. 7. The cams are so proportioned and designed that, referring to Fig. 8, when the point $4^a$ at which the rod 3 is pivoted to the wheel 4 is in its normal position in the line $h$ the contacts $9^b$, as above stated, are closed, the remaining contacts being open. Considering a complete revolution of the wheel 4 and the corresponding action of the cams in operating their respective switches, it may be noted that the contacts $9^b$ are closed during the rotation of the wheel from position $h$ to position $d$, at which latter position said contacts are open and are not again closed until at the position $c$, when the wheel has almost completed its revolution. Cam 10 closes contacts $10^b$ between positions $d$ and $e$, cam 11 holds contacts $11^b$ closed between positions $b$ and $a$, and cam 12 closes contacts $12^b$ only between positions $f$ and $g$.

Referring to Fig. 7, when the operator depresses the finger-key $s$ and closes switch S a circuit is closed through the motor, which circuit may be traced as follows: from the plus-line through contacts $9^b$, switch S, contact $s'$, resistance R, point $p$, motor-armature A to the minus-line. At the same time a branch circuit is closed from switch S through contact $s^2$, point $p'$, field-winding F to minus-line. The motor is thus started, and the wheel 4 passes from position $h$. It may be noted that before the wheel 4 reaches position $d$—namely, at position $b$—the field-switch $11^a$ is closed by cam 11, the contacts $11^b$ remaining closed for almost the whole revolution of said wheel, being opened again at position $a$. When position $d$ is reached, the contacts $10^b$ are closed, and immediately thereafter contacts $9^b$ are opened. The circuit to the motor is as follows: from the plus-line through contacts $10^b$, resistance R, point $p$, motor-armature A to the minus-line, also from the plus-line through contacts $11^b$, point $p'$, and from thence through the field F of the motor to the minus-line. The circuit is thus closed through the motor-armature during the rotation of wheel 4 from position $h$ to $e$, at which latter position the circuit is opened at contacts $10^b$. The inertia of the moving parts then carries wheel 4 around to the initial or idle position $h$. To insure the stopping of the crank-wheel at said initial position, contacts $12^b$ are closed by cam 12 when said wheel reaches position $f$, thereby completing a local circuit through the armature and producing a dynamic brake effect upon the motor, tending to stop the same. Said circuit may be traced from one terminal of the armature-winding through point $p^2$, contacts $12^b$, point $p$ to the opposite terminal of the armature-winding. This circuit remains closed until position $g$ is reached—that is, sufficiently long to produce the requisite braking action. By varying the relative arrangement of the various cams the opening and closing of the various contacts may be varied to produce the most efficient working conditions, and also to compensate for the use of different voltages. In case it is desired to repeat a record it is only necessary for the operator to hold his finger on the key until the calculating and recording are accomplished as many times as are desired. However, when the key $s$ is held depressed a circuit is completed from the plus-line through contacts $11^b$, contact $s^2$, through the bridge of switch S to contact $s'$, resistance R, contacts $12^b$, point $p^2$ to the minus-line. The main object, therefore, of resistance R is to prevent a short circuit on the line when the above-described circuit is completed. Said resistance R also gives adjustment in the system by giving a certain speed-reduction to the motor.

I have made provision for the locked condition of shaft 1, previously referred to, so that injury to the parts will not result therefrom. For this purpose I make the connection 3 a yielding one. Said connection preferably consists of a tubular member $3^a$ and a rod $3^b$, connected by a stiff coiled spring $3^c$. Said spring is carried upon the lower end of a rod $3^b$ between an adjustable nut $3^d$ on the end of said rod, and the collar $3^e$ secured in the end of the tube $3^a$ and through which the rod passes. Under normal operation of the machine the spring $3^c$ is sufficiently stiff not to give, and hence the arm 2 is actuated to rock shaft 1. If, however, the shaft 1 is locked, the crank-arm 2 is not free to move, and hence the additional pull on the spring $3^c$ causes it to yield sufficiently to permit the rotation of the wheel 4 without any movement of crank-arm 2.

Briefly, the operation of my driving mechanism is as follows: When it is desired to actuate the recording mechanism of the calculating-machine, the finger-key $s$ is momentarily depressed, thus closing switch S and completing a circuit through the motor-armature. The revolution of the armature-shaft causes the pinion 8, keyed thereon, to drive the spur-wheel 7 and in turn the crank-wheel 4. During the first part of a revolution of the wheel 4 the connecting-rod 3 is drawn upward and through the crank-arm 2 rocks the driving-shaft 1 through an angle of approximately forty-five degrees. Upon the return stroke of the rod 3 the shaft is rocked back to its initial position. Just prior to the completion of a half-revolution by the wheel 4 contacts $9^b$ and $10^b$ are opened, thereby opening the circuit of the motor-armature. During the second half of the revolution of wheel 4 the closing of a local circuit through contacts $11^b$ and $12^b$ and the armature tends to retard the rotation of the armature, the parts being adjusted, however, so that the momentum acquired is just sufficient to restore them to their normal positions. If for any reason the shaft is locked so that the crank 2 cannot be operated, the pull upon the rod $3^b$ will overcome the tension of spring $3^c$, which will give sufficiently to permit the rotation of wheel 4 without any consequent movement of crank-arm 2. If desired, a retractile spring $1^a$ may be used to return the shaft 1 to its normal position, the use of each spring being well known in connection with calculating-machines. When such a spring is used, it is obvious that the motor drives the shaft against the force of the spring, and the closure of the short circuit during the return of the shaft to its initial position acts as a brake.

I claim—

1. In an intermittently-driven mechanism, the combination with a motor, of gear driven thereby, a series of independently-adjustable cams actuated by said gear, switching mechanism in the motor-circuit controlled by said cam mechanism, and a driving-shaft for said intermittently-driven mechanism operated by said gear.

2. The combination with an intermittently-driven shaft, of a motor and a circuit therefor, a short circuit of said motor, gear connection between said motor and shaft, and cam mechanism for automatically opening the motor-circuit and closing said short circuit at predetermined points in the operation of said gear.

3. The combination with an intermittently-driven shaft, of a gear-wheel for operating the same, a motor for driving said gear-wheel, a circuit for said motor including a source of current, a short circuit of the motor, and a series of cams for opening said first-named circuit and closing said short circuit when said gear-wheel has completed part of a revolution.

4. The combination with an intermittently-driven shaft, of a gear-wheel for operating the same, a motor for driving said gear-wheel, a circuit for said motor including a source of current, a local circuit for the motor, and adjustable cam mechanism for opening said first-named circuit and closing said second circuit when said gear-wheel has completed part of a revolution.

5. The combination with an intermittently-driven shaft, of a motor and a circuit therefor, a crank driven by the motor, gear connection between said crank and shaft, cam mechanism controlled by said gear, switching mechanism in the motor-circuit automatically opened by said cam mechanism after a partial rotation of the crank, and a local circuit through the motor-armature including a switch automatically closed after a partial rotation of the crank, whereby said local circuit acts as a dynamic brake.

6. The combination with an intermittently-driven shaft, of a motor and a circuit therefor, a short circuit of said motor, gear driven by the motor for driving said shaft, adjustable cam mechanism carried by said gear, and switching mechanism in said circuits adapted to be operated by said cam mechanism at predetermined points in the operation of said gear.

7. The combination with an intermittently-driven shaft, of a motor, a crank driven thereby, and a yielding connection between said crank and shaft, whereby the driving operation of the crank is not transmitted to the shaft when said shaft is locked.

8. The combination with an intermittently-driven shaft, of a motor, a crank driven thereby, a crank carried by said driven shaft, and a yielding connection between said cranks, whereby the driving operation of said motor-driven crank is not transmitted to said other crank when the driven shaft is locked.

9. In an intermittently-driven mechanism, a motor-armature and circuit therefor, a field-magnet and circuit therefor, a switch connecting the circuits of the armature and fields with a source of current, and a switch for closing a short circuit of the armature, said switch being operated by the shaft of the armature in its rotation.

10. In an intermittently-driven mechanism, a motor-armature and circuit therefor, a field-magnet and circuit therefor, a switch connecting the circuits of the armature and fields with a source of current, and switching mechanism operated by the shaft of the armature at predetermined points to disconnect the armature from the source of supply and short-circuit said armature.

11. In an intermittently-driven mechanism, a motor-armature and circuit therefor, a field-magnet and circuit therefor, a switch connecting the circuits of the armature and fields with a source of current, switch-contacts adapted to short-circuit the armature, means connected with the armature for closing the contacts to short-circuit said armature and bring it to rest, other switch-contacts adapted to break the field-circuit, and means connected with the armature to open both said contacts before the armature comes to rest.

12. The combination with a shaft and a retractile spring therefor, of an electric motor, means for converting the rotating motion of the motor into a reciprocating motion of said shaft, a short-circuit switch for the armature, and means operated by the motor for closing said short-circuit switch during the retraction of said moving part by the spring; whereby the motor drives the shaft against the force of the spring and acts as a brake during the retraction of said spring.

13. In an intermittently-driven mechanism, the combination with a motor, of gear driven thereby, a series of switches in the motor-circuit, mechanism operated by said gear for controlling said switches, and a driving-shaft for said intermittently-driven mechanism operated by said gear.

14. The combination with an intermittently-driven shaft, of a motor and a circuit therefor, a short circuit of said motor, gear connection between said motor and said shaft, and mechanism operated by said gear for automatically opening the motor-circuit and closing said short circuit at predetermined points in the operation of the gear.

15. The combination with an intermittently-driven shaft, of gear for operating the same, a motor for driving said gear, a circuit for said motor including a source of current, a local circuit for the motor, and mechanism operated by said gear for opening said first-named circuit and closing said second circuit when said gear-wheel has completed part of a revolution.

In witness whereof I hereunto subscribe my name this 6th day of February, A. D. 1906.

FRANK R. McBERTY.

Witnesses:
JOHN G. ROBERTS,
GEORGE E. FOLK.